United States Patent
Shinozaki et al.

Patent Number: 5,259,872
Date of Patent: Nov. 9, 1993

[54] FIREPROOFING COVERING MATERIAL

[75] Inventors: Yukuo Shinozaki, Kashiwa; Mamoru Shinozaki, Funabashi; Hideo Fujinaka, Hasuda, all of Japan

[73] Assignee: Takenaka Corporation, Osaka, Japan

[21] Appl. No.: 778,227

[22] PCT Filed: Apr. 24, 1991

[86] PCT No.: PCT/JP91/00550
§ 371 Date: Dec. 11, 1991
§ 102(e) Date: Dec. 11, 1991

[87] PCT Pub. No.: WO91/16275
PCT Pub. Date: Oct. 31, 1991

[30] Foreign Application Priority Data
Apr. 25, 1990 [JP] Japan .................. 2-109548

[51] Int. Cl.$^5$ .................... C04B 11/00; C04B 2/06
[52] U.S. Cl. ...................... 106/18.11; 106/15.05; 106/18.12; 106/735; 106/772; 106/778
[58] Field of Search ............ 106/715, 765, 772, 775, 106/15.05, 16, 735, 778, 18.11, 18.12

[56] References Cited
FOREIGN PATENT DOCUMENTS
3230406  2/1984  Fed. Rep. of Germany ...... 106/772

Primary Examiner—Karl Group
Assistant Examiner—Paul Marcantoni
Attorney, Agent, or Firm—Kalish & Gilster

[57] ABSTRACT

This invention relates to a fireproofing covering material with cement matrix. Objects of this invention are to provide a fireproofing covering material with largely improved fire resistant performance and to provide a fireproofing covering material with largely improved fire resisting performance and durability.

The material of a first embodiment consists of 100 parts by weight of cement, 5 to 35 parts by weight of lime, 5 to 35 parts by weight of gypsum powder and 5 to 35 parts by weight of aluminosilica gel. The material of a second embodiment consists of 100 parts by weight of powder including 100 parts by weight of cement, 5 to 35 parts by weight of lime, 5 to 35 parts by weight of gypsum powder and 5 to 35 parts by weight of aluminosilica gel with addition of 50 to 300 parts by weight of ceramic balloon, 10 to 40 parts by weight of ceramic fiber and 5 to 20 parts by weight (solid content equivalency) of synthetic resin emulsion.

2 Claims, 2 Drawing Sheets

FIREPROOFING COVERING MATERIAL

BACKGROUND OF THE INVENTION

1. Field of the Invention

This invention relates to a fireproofing covering material with cement matrix.

2. Prior Art

Buildings are generally required to have certain fire resistant performances for their different parts under the Construction Standard Law.

Conventionally, structuring materials such as steel frames and folded plate ceiling are coated with fireproofing covering materials for improvement of their fire resistant performance.

Such fireproofing covering materials are often mixture of rock fiber and cement because of low cost.

This fireproofing covering material consisting of mixture of rock fiber and cement is sprayed to the surface of the structure when used.

The fireproofing layer formed on the structure by the use of such fireproofing covering material, however, does not have sufficient durability. It has only a low strength and high water absorption and high moisture permeation coefficient, resulting in weak adhesion.

In other words, when rock fiber fireproofing covering material is sprayed to a structure such as steel frame and folded plate ceiling, for example, a fireproofing layer is formed on the surface of the structure, but this fireproofing layer is susceptible to separation and peeling off due to internal dewing and water absorption.

Such rock fiber fireproofing covering material is accepted by the Standards for fire resistance, but a higher fire resistant performance is required now.

SUMMARY OF THE INVENTION

This invention is made to solve the above mentioned problems. It is an object of the fireproofing covering material of claim 1 to provide a fireproofing covering material with a largely improved fire resistant performance, and an object of the fireproofing covering material of claim 2 is to provide a fireproofing covering material with largely improved fire resistant performance and durability.

The fireproofing covering material of claim 1 comprises 100 parts by weight of cement, 5 to 35 parts by weight of lime, 5 to 35 parts by weight of gypsum powder and 5 to 35 parts by weight of aluminosilicate gel.

This fireproofing covering material is, for example, mixed with rock fiber and hydrated and sprayed to structures such as steel frames and folded plate ceiling. On the fireproofing layer formed on the structure surface, hydration of lime, gypsum plaster and aluminosilicate gel generate calcium sulfoaluminate-based hydrate product including a large amount of water such as $24H_2O$ and $32H_2O$. Such hydrate products serve for heat reduction when heated.

Lime, gypsum powder and aluminosilicate gel themselves have water molecules in their molecular structures and serve for heat reduction effect when the fireproofing layer is heated.

The fireproofing covering material of claim 2 is prepared by mixing 100 parts by weight of powder (consisting of 100 parts by weight of cement, 5 to 35 parts by weight of lime, 5 to 35 parts by weight of gypsum powder and 5 to 35 parts by weight of aluminosilicate gel) with 50 to 300 parts by weight of ceramic microspheres, 10 to 40 parts by weight of ceramic fiber and 5 to 20 parts by weight (solid content equivalency) of synthetic resin emulsion.

The fireproofing covering material may be applied to the structure by wet or dry process.

Application to structure by wet process is performed by spraying the material in viscous fluid state to a structure such as steel frame or folded plate ceiling or by applying it to structure with a trowel.

Application to structure by dry process is performed, for example, by curing a fireproofing covering material in viscous fluid state to form a plate to be fixed with a jig or adhered with adhesive.

This fireproofing covering material largely improves the fire resistant performance of coating materials for steel frames and other structural materials because of heat reduction effect caused by hydrate product with high water inclusion generated by reaction of lime, gypsum powder and aluminosilicate gel when heated and individual heat reduction effect of each of lime, gypsum powder and aluminosilicate gel as mentioned above.

Further, this fireproofing covering material contains ceramic microspheres and ceramic fiber and a large amount of other inorganic materials, resulting in improving not only fire resistant performance but also insulation performance.

Since the fireproofing covering material contains ceramic fiber and synthetic resin emulsion, ceramic fiber serves as the reinforcement material for a fireproofing layer formed on the structure surface and makes the internal bonding within the fireproofing covering material strong and effectively prevents cracks at the time of application to structure or heating. Further, synthetic resin emulsion improves adhesion to the structure and prevents the material from being separated when it is adhered to the structure or when heated.

In addition, when compared to conventional fireproofing covering materials, the fireproofing covering material of this invention has a more solid matrix and contains the ceramic microspheres in complete closed-cell state. This results in a lower water absorption and moisture permeation coefficients and prevents the dewing within the fireproofing layer from occurring.

This material also improves the strength and adhesion of fireproofing layer and reduces the moisture permeability and mixing of ceramic microspheres makes the material weight lighter. In addition, this fireproofing covering material is much stronger than conventional ones and can be finished with a smooth surface, and the fireproofing layer itself can be used as the finish surface or can be used as the base for direct finishing such as painting, spraying, clothing and tiling.

In particular, when a small amount of ceramic microspheres is mixed, the surface of the fireproofing layer becomes smooth and can be used as the finishing layer.

In this invention, lime, plaster and aluminosilicate gel are respectively added by 5 to 35 parts by weight to 100 parts by weight of cement. If they are below 5 parts by weight, heat generation suppressing effect when the fireproofing covering material is heated will be too small and if they are more than 35 parts by weight, the fireproofing layer formed on the structure will become weaker.

To 100 parts by weight of powder, ceramic microspheres is added by 50 to 300 parts by weight because sufficient lightness and heat insulation performance cannot be expected by addition of ceramic microspheres below 50 parts by weight and the strength will be lower when ceramic balloon become more than 300 parts by weight. The best amount of ceramic microspheres which will bring a high strength and good finish is about 50 parts by weight.

Further, to 100 parts by weight of powder, synthetic resin emulsion is added by 5 to 20 parts by weight (solid content equivalency) because the adhesion is not sufficient when it is less than 5 parts by weight and the fire resistant performance will be degraded when it is more than 20 parts by weight.

To 100 parts by weight of powder, ceramic fiber is added by 10 to 40 parts by weight because the ceramic fiber less than 10 parts by weight cannot realize sufficient reinforcement effect and that more than 40 parts by weight makes the cement brittle by reducing the bonding power (binder effect) of the cement to be a matrix.

DESCRIPTION OF THE PREFERRED EMBODIMENTS

Preferred embodiments of this invention are described below.

Embodiment 1

To obtain a fireproofing covering material of this invention, powder is prepared by mixing 100 parts by weight of high-early-strength Portland cement, 14.3 parts by weight of lime, 14.3 parts by weight of gypsum powder and 14.3 parts by weight of aluminosilicate gel.

To 100 parts by weight of the powder obtained are added 200 parts by weight of ceramic microspheres, 33.3 parts by weight of ceramic fiber, 15 parts by weight of ethylene-vinyl acetate based emulsion (solid content density: 9%) in solid content equivalency and a small amount of thickening agent and antifoamer, all of which are mixed and kneaded.

Aluminosilicate gel is, for example, volcanic ash such as allophane.

Ceramic fiber has, for example, a fiber length of about 6 mm.

Ceramic microspheres has a particle diameter of 5 to 200 micrometers for example and a specific gravity of 0.3 to 0.7.

Thickening agent is a water soluble high molecular compound such as methyl cellulose, polyvinyl alcohol and hydroxyethyl cellulose.

When the fireproofing covering material thus formed was cured and tested for its performance, it had a bending strength of 14.4 kgf/cm$^2$, a compressive strength of 30.1 kgf/cm$^2$, and a specific gravity of 0.55.

Embodiment 2

To 100 parts by weight of high-early-strength Portland cement are mixed 27.3 parts by weight of lime, 27.3 parts by weight of gypsum powder and 27.3 parts by weight of aluminosilica gel to prepare powder.

To 100 parts by weight of this powder are added 100 parts by weight of ceramic microspheres, 16.7 parts by weight of ceramic fiber and 7.5 parts by weight (in solid content equivalency) of ethylene-vinyl acetate based emulsion (solid content density: 9%) and a small amount of water-soluble resin and the mixture is mixed and kneaded.

When the fireproofing covering material thus formed was cured and subjected to performance test, it had a bending strength of 23.3 kgf/cm$^2$, a compressive strength of 62.4 kgf/cm$^2$, and a specific gravity of 0.65.

Figure 1:
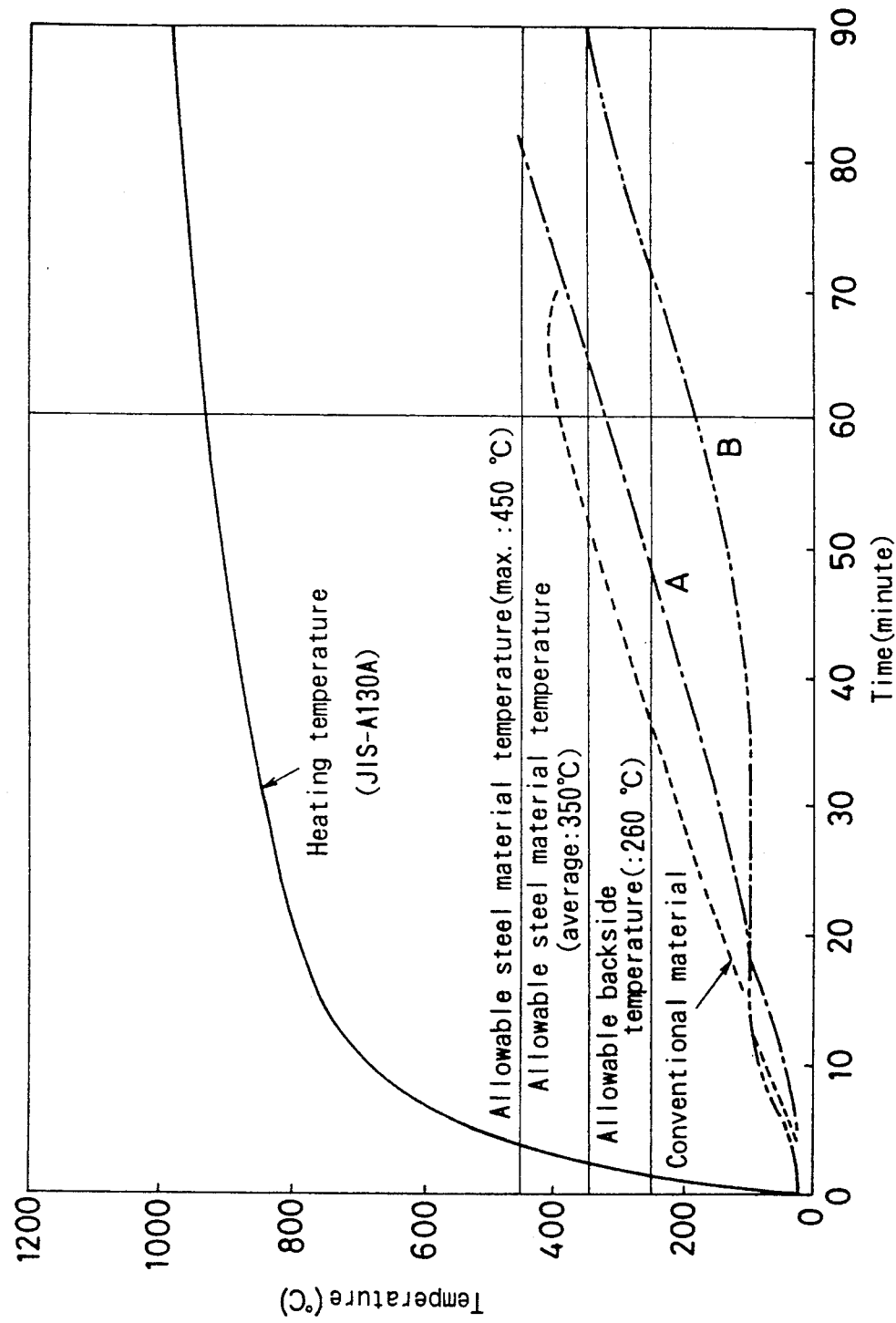
FIG. 1 is a graph showing the results of fire resistance test of a fireproofing plate formed by curing the fireproofing covering material of this invention.

For this embodiment 2, heating test was effected according to JIS-A-1304 "Method of Fire Resistance Test for Structural Parts of Buildings". FIG. 1 shows the test results.

In this figure, ordinate axis indicates temperature (°C.) and abscissa axis indicates the time elapsed (minutes).

Figure 2:
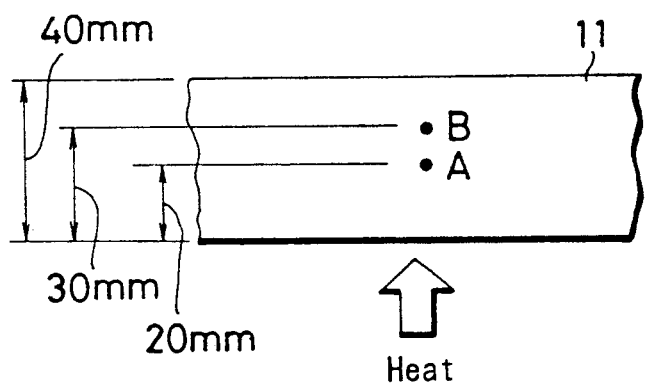
FIG. 2 is an explanatory view illustrating the positions to take temperature data for fireproofing plate in fire resistance test.

The solid line indicates the heating temperature; the dot and dash line indicates the temperature at the point 20 mm apart from the heated surface of the fireproofing plate, made by curing of the fireproofing covering material of this invention, that is the internal temperature at point A of the fireproofing covering material plate shown in FIG. 2; the two-dot and dash line indicates the temperature at the point 30 mm apart from the heated surface of the fireproofing plate 11, that is the internal temperature at point B of the fireproofing plate 11 shown in FIG. 2; and the broken line indicates the internal temperature at the point 20 mm apart from the heated surface of a conventional (approved by the Ministry of Construction) inorganic fiber mixed calcium silicate plate (No. 1).

The inorganic fiber mixed calcium silicate plate as a conventional product has a specific gravity of 0.4 or more, a bending strength of 25 kgf/cm$^2$, and a compressive strength of 30 kgf/cm$^2$.

The fireproofing plate 11 is 40 mm thick and 500 mm wide and 500 mm long. This fireproofing plate 11 is horizontally placed on the top of the heating device (300 mm wide and deep and 500 mm high. Combustion: municipal gas) and heated for at least one hour.

As a result, as shown in FIG. 1, the fireproofing plate 11 provided with the cured fireproofing covering material of this invention shows a temperature below the allowable steel material temperature (450° C. at most and 350° C. on average) when 60 minutes have elapsed. Inorganic fiber mixed calcium silicate plate shows a temperature below the maximum allowable steel material temperature (450° C.) but over the average allowable steel material temperature (350° C.) when 60 minutes have passed.

The temperature at the point 30 mm apart from the heated surface of the fireproofing plate 11, i.e. the internal temperature at point B is below 260° C., which is the allowable backside temperature for partition walls when 60 minutes have passed.

When compared with a conventional inorganic fiber mixed calcium silicate plate, internal temperature rises gently and the time elapsed until the maximum allowable steel material temperature of 450° C., average allowable steel material temperature of 350° C., or allowable backside temperature of 260° C. are reached is greatly extended. This means that the fireproofing plate 11 using the fireproofing covering material of this invention has the better fire resistant performance.

When the internal temperatures are compared between the points A and B of the fireproofing plate 11, the point B shows extremely slower rising of the internal temperature than the point A. This tells that the thicker the fireproofing covering material of this invention becomes, the better the fire resistant performance improves.

Even when the amounts of the ingredients to 100 parts by weight of cement are changed in the range of 5 to 35 parts by weight for lime, 5 to 35 parts by weight for gypsum powder and 5 to 35 parts by weight for aluminosilicate gel, almost the same effect as the above embodiment can be obtained.

To 100 parts by weight of the powder formed by mixing 5 to 35 parts by weight of lime, 5 to 35 parts by weight of gypsum powder, and 5 to 35 parts by weight of aluminosilicate gel with 100 parts by weight of cement, amount of the ingredients may be changed in the range of 50 to 300 parts by weight for ceramic balloon, 10 to 40 parts by weight for ceramic fiber, and 5 to 20 parts by weight (solid content equivalency) for synthetic resin emulsion to obtain the similar effect as the above embodiment. By changing the ratio of the ingredients, strength and finishing states can be changed, so that a fireproofing covering material having the fire-resistant performance, strength and finish suitable for its application can be obtained.

Although the invention has been described in its preferred embodiments where a small amount of thickening agent and antifoamer are added, it is understood that the invention is not limited to these specific embodiments, and almost the same effect as the above embodiments can be obtained without adding such thickening agent and antifoamer or with adding other materials as necessary.

Industrial Applicability

The fireproofing covering material of claim 1 consisting of 100 parts by weight of cement, 5 to 35 parts by weight of lime, 5 to 35 parts by weight of gypsum powder and 5 to 35 parts by weight of aluminosilicate gel can largely improve the fire resistant performance.

Such a fireproofing covering material may be, for example, hydrated by mixing with rock fiber as in conventional procedures and sprayed to the structure.

The fireproofing layer formed on the structure surface causes calcium-sulfo-aluminate based hydrated products containing much amount of water such as $24H_2O$ and $32H_2O$ to be generated by hydration reaction among lime, gypsum powder and aluminosilicate gel, these hydrated products serving for heat reduction when the material is heated and lime, gypsum powder and aluminosilicate gel themselves having some water molecules in their molecular structure also serve for heat reduction when the fireproofing layer is heated and largely improve the fire resistant performance of the coated material such as steel frame.

The fireproofing covering material of claim 2 is made of 100 parts by weight of powder which consists of 100 parts by weight of cement, 5 to 35 parts by weight of lime, 5 to 35 parts by weight of gypsum powder and 5 to 35 parts by weight of aluminosilicate gel and to which 50 to 300 parts by weight of ceramic microspheres, 10 to 40 parts by weight of ceramic fiber and 5 to 20 parts by weight (solid content equivalency) of synthetic resin emulsion are added and can largely improve the fire resistant performance and durability.

Addition of lime, gypsum powder and aluminosilicate gel considerably improves the fire resistant performance of the coated material such as steel frames because of the heat generation suppressing effect against heating of the hydrated product generated by hydrate reaction and heat generation suppressing effect of each ingredient. In addition, mixing of ceramic microspheres and ceramic fiber results in that high amount of inorganic material contents, which improves fire resistant performance and heat insulation performance.

Further, containing of ceramic fiber and synthetic resin emulsion causes the ceramic fiber to serve as the reinforcing material and enhance the internal bonding of the fireproofing covering material, which effectively prevents cracks to be generated at the time of adhesion to the structure or of heating. The synthetic resin emulsion also improves adhesion to the structure and ensures to prevent the material from being separated during adhesion and when heated.

Compared to conventional fireproofing covering material, matrix of this material is more solid and the ceramic microspheres to be mixed to is in complete closed-cell state. This makes the water absorption and moisture permeation coefficient smaller, which prevents internal dewing in the fireproofing layer and ensures to prevent the separation of the fireproofing layer.

The fireproofing covering material of this invention has a compressive strength of 30 to 70 kfg/cm$^2$, a tensile strength of 10 kgf/cm$^2$ or more and a water absorption ratio of around 20 to 30%.

In contrast, rock fiber fireproofing covering material generally used has a larger amount of rock fiber compared to the amount of cement which causes binder effect in its material ingredients, it is quite dry and both compressive strength and tensile strength are 1 kgf/cm$^2$ or less and the water absorption ration is so high that the water can be absorbed until saturation. Moisture permeation resistance is also quite poor.

Thus, the fireproofing covering material of this invention can improve the strength and adhesion of the fireproofing layer and reduce the moisture permeation coefficient. In addition, mixing of ceramic microspheres contributes to a lighter weight. Accordingly, the fireproofing layer itself can be used as finish surface, or can be used as the base for direct painting, spraying, clothing or tiling.

In particular, mixing of ceramic balloon in a small amount causes the fireproofing layer surface to be quite smooth and can be used as the finish surface as it is.

What is claimed is:

1. A fireproofing covering material consisting of 100 parts by weight of cement, 5 to 35 parts by weight of lime, 5 to 35 parts by weight of gypsum powder and 5 to 35 parts by weight of aluminosilicate gel.

2. A fireproofing covering material consisting of 100 parts by weight of cement, 5 to 35 parts by weight of lime, 5 to 35 parts by weight of gypsum powder and 5 to 35 parts by weight of aluminosilicate gel, 50 to 300 parts by weight of ceramic microspheres, 10 to 40 parts by weight by ceramic fiber and 5 to 20 parts by weight solid content equivalency of synthetic resin emulsion.

* * * * *